Sept. 25, 1962        R. A. FLORA        3,055,476

SPEED SENSITIVE DRIVING CLUTCH MECHANISM

Filed Oct. 27, 1960

INVENTOR.
Raymond A. Flora
BY
His Attorney

United States Patent Office 3,055,476
Patented Sept. 25, 1962

3,055,476
SPEED SENSITIVE DRIVING CLUTCH MECHANISM
Raymond A. Flora, Dayton, Ohio, assignor to General Motors Corporation, Detroit, Mich., a corporation of Delaware
Filed Oct. 27, 1960, Ser. No. 65,340
2 Claims. (Cl. 192—104)

This invention relates to clutch mechanisms adapted for controlling a driving connection between a driving member and a driven member.

An object of the invention is to provide a driving clutch mechanism that is actuated in response to the speed of operation of the driven member so that the clutch mechanism will engage and disengage during operation of the mechanism to maintain a relatively constant predetermined speed of operation of the driven member irrespective of the driving speed of the driving member at some higher speed of operation, the driving clutch mechanism providing, in effect, a floating clutch between the driving and the driven members to control the maximum speed of rotation of the driven member.

Further objects and advantages of the present invention will be apparent from the following description, reference being had to the accompanying drawings wherein a preferred embodiment of the present invention is clearly shown.

Figures 1, 2:
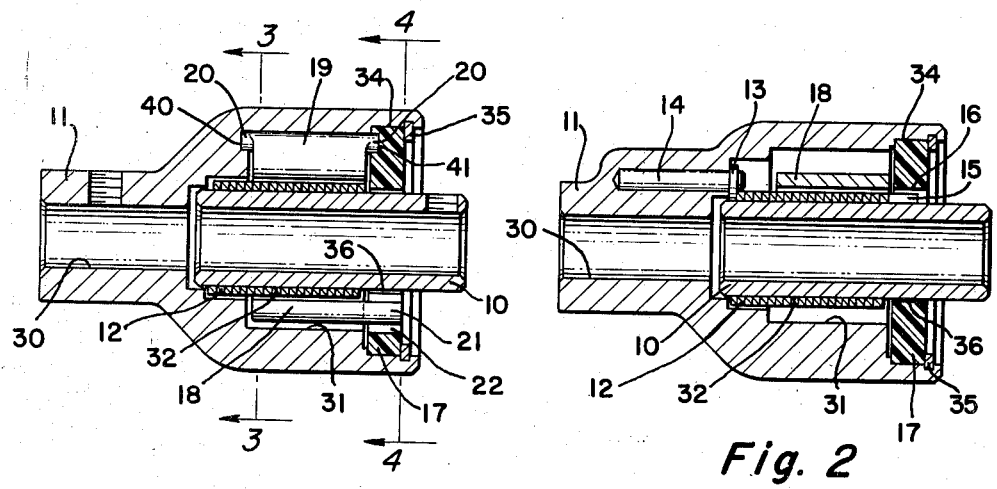
FIGURE 1 is a longitudinal cross-sectional view of the clutch mechanism taken along line 1—1 of FIGURE 4.
FIGURE 2 is a longitudinal cross-sectional view taken along line 2—2 of FIGURE 3.

In this invention, the clutch mechanism consists of a driving member 10 provided in the form of a sleeve having a hollow bore to receive a shaft from any suitable source of power. A driven member 11 is provided around the sleeve or driving member 10 and has a bore 30 adapted to receive a shaft from any suitable device adapted to be driven. The driven member 11 is formed with a chamber space 31 around the circular periphery 32 on the end of the driving member 10.

The driving member 10 and the driven member 11 are drivingly connected by a closed spring 12 that has an internal diameter substantially the same as the external diameter of the cylindrical surface 32 on the driving member 10 so that when the spring 12 is in static condition, the inner periphery of the spring will engage the outer periphery of the driving member 10 with sufficient frictional force as to cause the spring to wrap in the direction of rotation of the driving member 10 when the driving member 10 is rotating in the direction of the arrow 33, the wrap of the coil spring 12 is in the direction of the arrow 33a so as to effectively tighten the coil spring on the periphery of the driving member 10.

One end of the spring 12 has a loop 13 that fits over a pin 14 located in the driven member 11. Thus, one end of the spring 12 is held stationary with respect to the driven member 11.

The chamber space 31 in the driven member 11 has an annular radially extending groove 34 that receives a rotatable member 17, preferably in the form of a washer of a material that is self-lubricating such as nylon in its rotation in the groove 34. The rotatable member 17 is secured in position in the groove 34 by a snap ring 35. The driving member 10 extends through a central bore 36 in the rotatable member 17.

Figure 3:
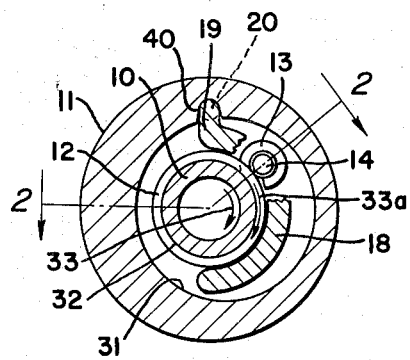
FIGURE 3 is a transverse cross-sectional view taken along line 3—3 of FIGURE 1.

The member 17 has a radially extending slot 16 that receives the end 15 of the spring 12, the end 15 being a free end for rotation relative to the fixed end 13 of the spring either in the direction of rotation of the arrows, as shown in FIGURE 3, or in reverse rotation when the rotatable member 17 is actuated in a manner hereinafter described.

Figure 4:
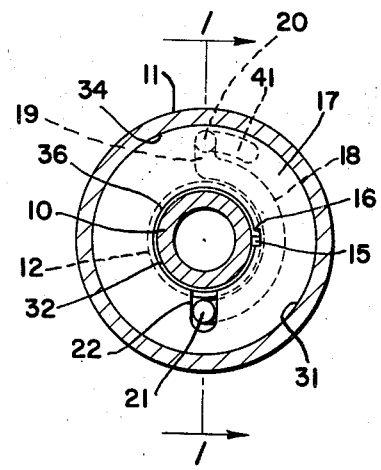
FIGURE 4 is a transverse cross-sectional view taken along line 4—4 of FIGURE 1.

When the member 17 rotates in a counterclockwise direction, as viewed in FIGURE 4, the spring end 15 will be rotated in a direction to unwrap the spring 12 and thereby release it from driving connection with the driving member 10.

A weight member 18 has one end 19 pivotally supported by the bearing extensions 20 at opposite ends thereof, one of which pivotally supports the member 18 in the bearing recess 40 at one end of the chambered recess in the driven member 11 and the opposite end of the member 18 being supported in a peripherally extending slot 41 provided in the rotatable member 17 in the face thereof that closes the chamber space 31 in the driven member 11.

The lower end of the weight member 18 has a projection 21 that extends into a radially extending slot 22 in the rotatable member 17 so that as the weight member swings about its axis formed by the bearing extensions 20 in a counterclockwise direction as viewed in FIGURE 4, rotatable member 17 will be rotated in a counterclockwise direction when the weight member swings in a counterclockwise direction, as viewed in FIGURE 4.

Obviously, since the weight member 18 is pivotally supported in the chamber space 31, it is influenced by the effect of centrifugal force when the driven member is rotated by the driving member. So long as the weight member 18 is in the position shown in FIGURE 4, the driving member 10 will wrap the spring 12 in the direction of the arrows 33 and 33a to effect frictional drive between the spring and the driving member and by its connection 13 with the driven member to drive this member at the speed of rotation of the driving member 10.

However, as the speed of rotation of the driven member 11 increases, centrifugal force will act on the weight member 18 causing it to rotate in a counterclockwise direction, as viewed in FIGURE 4, so as to rotate the member 17 in a counterclockwise direction and thereby cause the end 15 of the spring 12 to unwrap the spring and cause it to release from driving engagement with the driving member 10. The slot 41 in the member 17 permits the counterclockwise rotation of the member 17 relative to the bearing support 20 and yet provides a bearing support for this member at one end of the weight member 18.

Obviously, the effect of centrifugal force on the weight member 18 will occur at a predetermined speed of rotation of the driven member 18 as regulated by the force effect of the spring 12 acting on the member 17 through the end 15 of the spring. When the centrifugal force effect on the weight 18 is sufficient to overcome the wrap-up torque of the spring 12, the member 17 will rotate counterclockwise as heretofore described and release the frictional driving engagement between the spring 12 and the driving member 10. Under this condition, the driven member 11 will reach a maximum predetermined speed of rotation irrespective of the fact that the driving member 10 may be rotating at a much higher speed. Thus, the driving member 10 may be directly connected to an electric motor operating, for example, at a speed of 1750 r.p.m, whereas the driven member 11 can be rotated at a much lower speed, depending upon the speed of rotation at which the weight member 18 will effect the release of the spring 12 from the driving member 10. Thus, the driven member 11 can be said to float on the driving member 10 with the engagement and disengagement of the clutch mechanism maintaining the driven speed of the member 11 at a much lower value than the driving speed of the member 10.

While the embodiment of the present invention, as herein disclosed, constitutes a preferred form, it is to be understood that other forms might be adopted.

What is claimed is as follows:

1. A speed sensitive driving clutch mechanism, comprising, a driving member having a circular peripheral surface, a driven member around one end of said driving member and having a housing portion in spaced relation to said circular surface forming thereby a chamber space therebetween, a coil spring member disposed in said chamber space around said circular peripheral surface wrapped in the direction of rotation of said driving member and engaging the same in static condition and having one end thereof attached to said driven member, said coil spring providing driving connection between said driving and driven members on rotation of said driving member in the direction of wrap of said spring to tighten the same on said driving member, a rotatable disc member in said chamber space rotatably supported in said housing portion adjacent the opposite end of said spring and engaged by the said spring opposite end, and a centrifugally operated device pivotally carried by said driven member in said chamber actuated by the speed of rotation of said driven member and connected to said rotatable disc member to rotate the same on actuation of the centrifugally operated device in a direction to unwrap said spring and release thereby said driving member from said driven member to regulate the speed of rotation of said driven member relative to said driving member.

2. A speed sensitive driving clutch mechanism, comprising, a driving member having a circular peripheral surface, a driven member around one end of said driving member and having a housing portion in spaced relation to said circular surface forming thereby a chamber space therebetween, a coil spring member around said circular peripheral surface wrapped in the direction of rotation of said driving member and engaging the same in static condition and having one end thereof attached to said driven member, said coil spring providing driving connection between said driving and driven members on rotation of said driving member in the direction of wrap of said spring to tighten the same on said driving member, a rotatable disc member in said chamber space rotatably supported in said housing portion adjacent the opposite end of said spring and disposed coaxial of said circular peripheral surface and radial therefrom and engaged by the said opposite end of said spring, a weight member pivotally supported in said chamber space in said driven member for rocking motion in said chamber space and including pivot means having one end supported on said driven member and the opposite end supported on said disc member in a circumferentially extending slot and having a part thereof remote from said pivot engaging said rotatable member to effect rotation of the said member on pivotal movement of the said weight in the said chamber space, said weight being actuated by the action of centrifugal force applied thereto on rotation of said driven member to rotate said rotatable member when the speed of rotation of said driven member reaches a predetermined value, said opposite end of said spring engaging said rotatable member to effect unwrapping of said spring on rotation of said rotatable member by actuation of said weight to regulate thereby the speed of rotation of said driven member relative to said driving member.

References Cited in the file of this patent

UNITED STATES PATENTS

| | | |
|---|---|---|
| 2,510,653 | Pepper | June 6, 1950 |
| 2,829,748 | Sacchini et al. | Apr. 8, 1958 |
| 2,954,109 | Jardine | Sept. 27, 1960 |